(12) United States Patent
Grant et al.

(10) Patent No.: US 11,436,117 B2
(45) Date of Patent: Sep. 6, 2022

(54) CONTEXT AWARE DYNAMIC RELATIVE POSITIONING OF FOG NODES IN A FOG COMPUTING ECOSYSTEM

(71) Applicant: INTERNATIONAL BUSINESS MACHINES CORPORATION, Armonk, NY (US)

(72) Inventors: Robert Huntington Grant, Marietta, GA (US); Zachary A. Silverstein, Jacksonville, FL (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 16/869,693

(22) Filed: May 8, 2020

(65) Prior Publication Data
US 2021/0349799 A1     Nov. 11, 2021

(51) Int. Cl.
*G06F 15/173*   (2006.01)
*G06F 11/30*    (2006.01)
*H04L 67/1097*  (2022.01)
*H04L 67/12*    (2022.01)

(52) U.S. Cl.
CPC ...... *G06F 11/3089* (2013.01); *G06F 11/3006* (2013.01); *G06F 11/3013* (2013.01); *H04L 67/1097* (2013.01); *H04L 67/12* (2013.01)

(58) Field of Classification Search
CPC ............. G06F 11/3089; G06F 11/3006; G06F 11/3013; H04L 67/1097; H04L 67/12
See application file for complete search history.

(56) References Cited

U.S. PATENT DOCUMENTS

| 10,187,252 B2 | 1/2019 | Byers et al. |
| 10,262,019 B1 | 4/2019 | Reiner et al. |
| 2016/0182639 A1 | 6/2016 | Hong et al. |

(Continued)

FOREIGN PATENT DOCUMENTS

| WO | 2015095484 A1 | 6/2015 |
| WO | 2019071101 A1 | 4/2019 |

OTHER PUBLICATIONS

Soo, "Towards Proactive Mobility—Aware Fog Computing", May 16, 2017, 72 pages.

(Continued)

*Primary Examiner* — Anh Nguyen
(74) *Attorney, Agent, or Firm* — Daniel Yeates; Andrew D. Wright; Roberts Calderon Safran & Cole, P.C.

(57) ABSTRACT

Methods and systems for context aware dynamic relative positioning of fog nodes in a fog computing ecosystem are disclosed. A method includes: receiving, by a computing device, data from a plurality of Internet-of-Things (IoT) sensors in an environment; creating, by the computing device, a model using the data from the plurality of IoT sensors; determining, by the computing device, a number of computing nodes based on the model and additional data received from the plurality of IoT sensors; and deploying, by the computing device, at least one mobile computing node in the environment based on the determined number of computing nodes and a number of existing computing nodes in the environment.

20 Claims, 5 Drawing Sheets

(56) References Cited

U.S. PATENT DOCUMENTS

| | | |
|---|---|---|
| 2017/0048308 A1 | 2/2017 | Qaisar |
| 2017/0244601 A1 | 8/2017 | Byers et al. |
| 2018/0102985 A1 | 4/2018 | Byers et al. |
| 2018/0109428 A1* | 4/2018 | Kattepur ............. H04L 43/0852 |
| 2018/0181868 A1* | 6/2018 | Chew ....................... G06N 3/08 |
| 2018/0316555 A1 | 11/2018 | Salgueiro et al. |
| 2019/0045033 A1 | 2/2019 | Agerstam et al. |
| 2019/0245806 A1* | 8/2019 | Hanes ................... H04L 41/147 |

OTHER PUBLICATIONS

Maiti et al., "QoS-aware fog nodes placement", Mar. 2018, 7 pages.
Mell et al., "The NIST Definition of Cloud Computing", NIST, Special Publication 800-145, Sep. 2011, 7 pages.
MarketsandMarkets, "Fog Computing Market Worth 203.48 Million USD by 2022" Sep. 12, 2016, 4 pages.
Skarlat et al., "Optimized IoT service placement in the fog" Oct. 4, 2017, 37 pages.
Unknown, "Edge Computing Market Worth $43.4 Billion By 2027 | CAGR: 37.4%", Mar. 2020, 6 pages.
Byers et al. "OpenFog Reference Architecture for Fog Computing" Feb. 2017, 162 pages.

* cited by examiner

CONTEXT AWARE DYNAMIC RELATIVE POSITIONING OF FOG NODES IN A FOG COMPUTING ECOSYSTEM

BACKGROUND

Aspects of the present invention generally relate to computing devices and, more particularly, to methods and systems for context aware dynamic relative positioning of fog nodes in a fog computing ecosystem.

Internet of Things (IoT) devices include Internet and/or network-connected home and building automation devices (e.g., smart home devices/appliances), sensors and sensor networks, control systems, etc. IoT devices generate a significant volume and variety of data. An estimated 50 billion IoT devices will be connected to the Internet by 2020. Data from IoT devices may be transmitted to the cloud and analyzed using cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

SUMMARY

In a first aspect of the invention, there is a method that includes: receiving, by a computing device, data from a plurality of Internet-of-Things (IoT) sensors in an environment; creating, by the computing device, a model using the data from the plurality of IoT sensors; determining, by the computing device, a number of computing nodes based on the model and additional data received from the plurality of IoT sensors; and deploying, by the computing device, at least one mobile computing node in the environment based on the determined number of computing nodes and a number of existing computing nodes in the environment.

In another aspect of the invention, there is a computer program product that includes one or more computer readable storage media having program instructions collectively stored on the one or more computer readable storage media. The program instructions are executable to: receive data from a plurality of Internet-of-Things (IoT) sensors in an environment; create a model using the data from the plurality of IoT sensors; determine a change in the environment based on the model and additional data received from the plurality of IoT sensors; determine a number of computing nodes based on the model and the change in the environment; and deploy at least one mobile computing node in the environment based on the determined number of computing nodes and a number of existing computing nodes in the environment.

In another aspect of the invention, there is a system that includes: a processor, a computer readable memory, one or more computer readable storage media, and program instructions collectively stored on the one or more computer readable storage media, the program instructions executable to: receive data from a plurality of Internet-of-Things (IoT) sensors in an environment; create a model using the data from the plurality of IoT sensors; determine a number of computing nodes based on the model and additional data received from the plurality of IoT sensors; and deploy at least one mobile computing node in the environment based on the determined number of computing nodes and a number of existing computing nodes in the environment.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
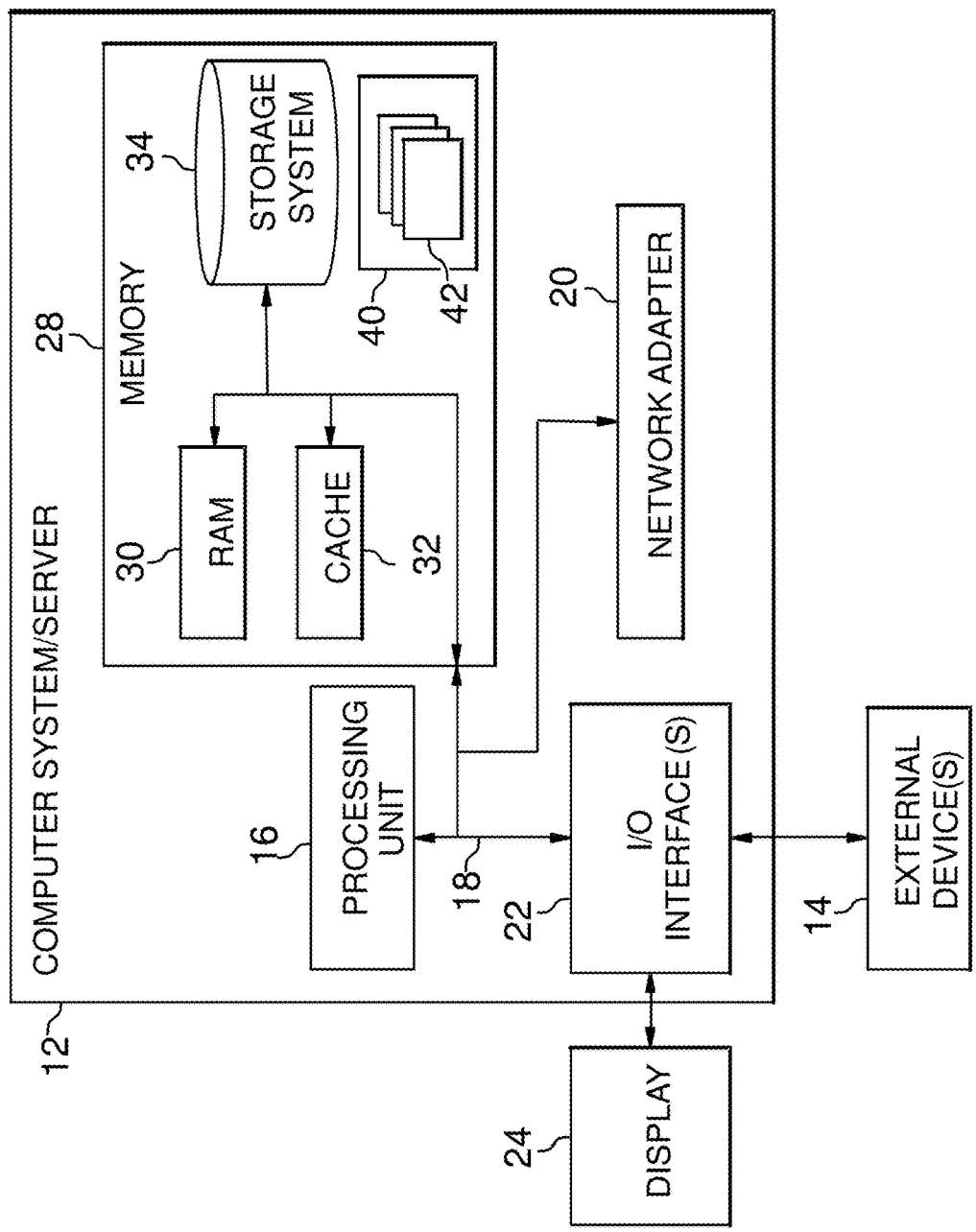
FIG. 1 depicts a cloud computing node according to an embodiment of the present invention.

Aspects of the present invention generally relate to computing devices and, more particularly, to methods and systems for context aware dynamic relative positioning of fog nodes in a fog computing ecosystem. As described herein, aspects of the invention include a method and system for analyzing and acting on IoT data using "edge computing" or "fog computing." In particular, aspects of the invention include a method and system that analyze the most time-sensitive data at the network edge, close to where it is generated, instead of sending vast amounts of IoT data to the cloud. In embodiments, IoT data is acted on in milliseconds, based on policy. Additionally, in embodiments, selected data is sent to the cloud for historical analysis and longer-term storage.

In particular, in embodiments, a method and system predict the volume, velocity, variety, and variability of data generated from different IoT sensors spread across an environment. In embodiments, the predictions are based on a predicted contextual situation; a mobility pattern of one or more IoT sensors; a wireless network range; types of wireless connectivity; and/or a volume, velocity, variety, and/or variability of gathered data, etc. In embodiments, an appropriate number of "fog nodes" are deployed in the environment with appropriate relative positions, directions, etc. to ensure that the generated data can be captured properly and processed on a near real-time basis.

Conventional cloud computing models are not designed for the volume, variety, and velocity of data that IoT devices generate. Billions of previously unconnected devices are generating more than two exabytes of data each day as of 2020, and this number continues to grow on a daily basis. Moving all data from these IoT devices to the cloud for analysis requires vast amounts of bandwidth, and by the time the data makes its way to the cloud for analysis, the opportunity to act on it may have passed.

Embodiments address these problems by providing for context aware dynamic relative positioning of fog nodes in a fog computing ecosystem. Accordingly, embodiments improve the functioning of a computer by providing methods and systems for analyzing and acting on IoT data using edge computing or fog computing. In particular, embodiments improve the functioning of a computer by providing a method and system that analyze the most time-sensitive data at the network edge, close to where it is generated, instead of sending vast amounts of IoT data to the cloud.

Furthermore, embodiments improve the functioning of a computer by providing a method and system that act on IoT data in milliseconds, based on policy. Furthermore, embodiments improve the functioning of a computer by providing a method and system that send selected data to the cloud for historical analysis and longer-term storage. Additionally, implementations of the invention use techniques that are, by definition, rooted in computer technology (e.g., IoT devices, cloud computing, edge computing, and fog computing).

In embodiments, a system and method are provided for an artificial intelligence (AI) system that use historical machine learning to predict a contextual situation and accordingly predict a data transfer, storage, and computation load in the fog computing ecosystem considering the volume, velocity, variety, and variability of data generated from different IoT sensors present in the surrounding environment. In embodiments, the AI system identifies real-time positions of different IoT sensors and predicts locations of different mobile IoT sensors in the surrounding environment and accordingly the AI system identifies optimum relative positions of one or more "fog nodes" in the ecosystem, so that gathered data can be captured completely, and computation needs can be satisfied with the received data. In embodiments, the AI system considers the wireless network strength, types of wireless connectivity, and volume and velocity of data, and accordingly places appropriate "fog nodes" to form a fog node mesh and ensure all data is captured and processed as per demand.

It should be understood that, to the extent implementations of the invention collect, store, or employ personal information provided by, or obtained from, individuals (for example, data from IoT devices), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information. Additionally, personal data privacy may be ensured within node prediction and placement thereof based on privacy planning. Privacy may be addressed through placement optimization of public, private, and hybrid nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
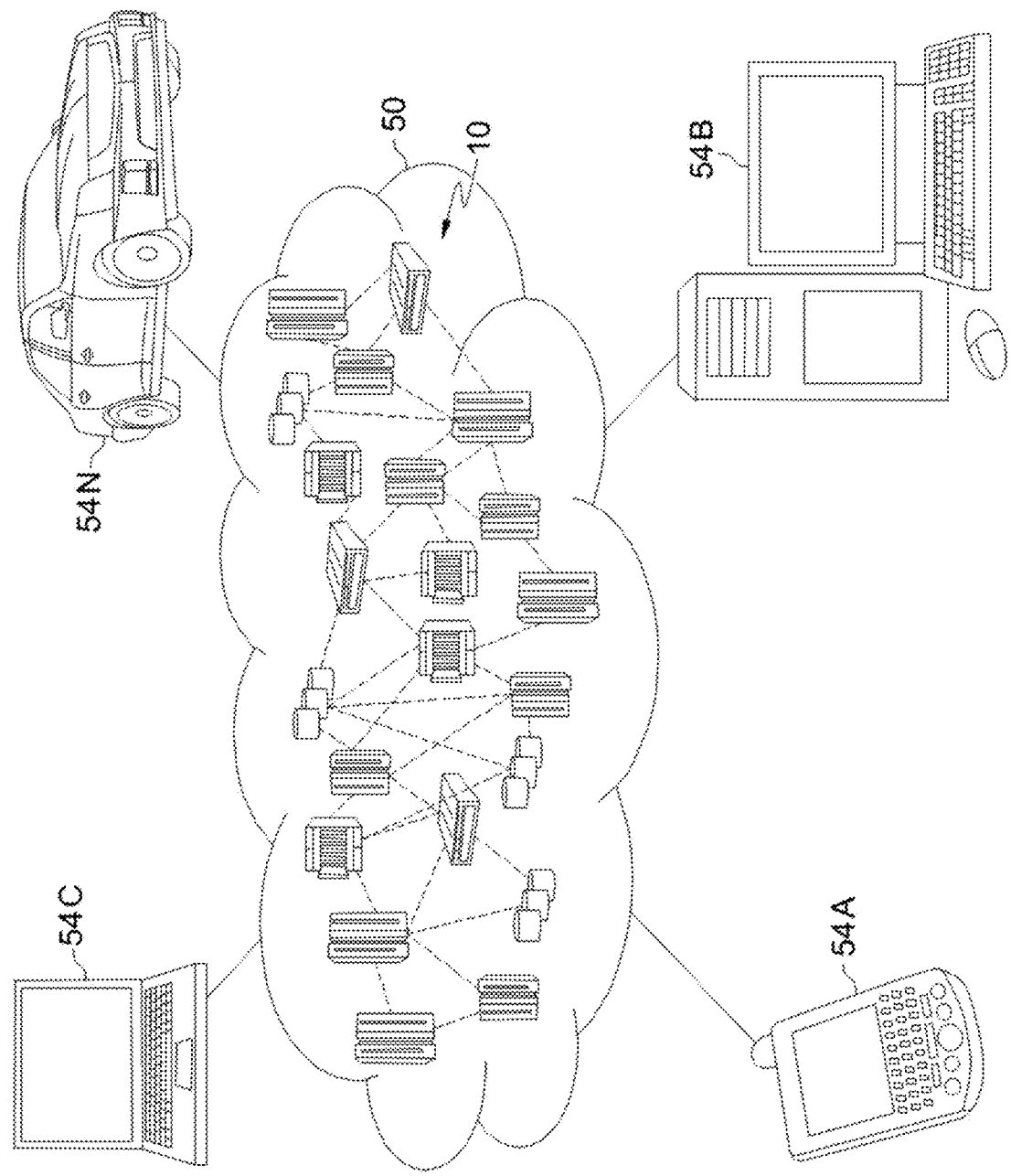
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
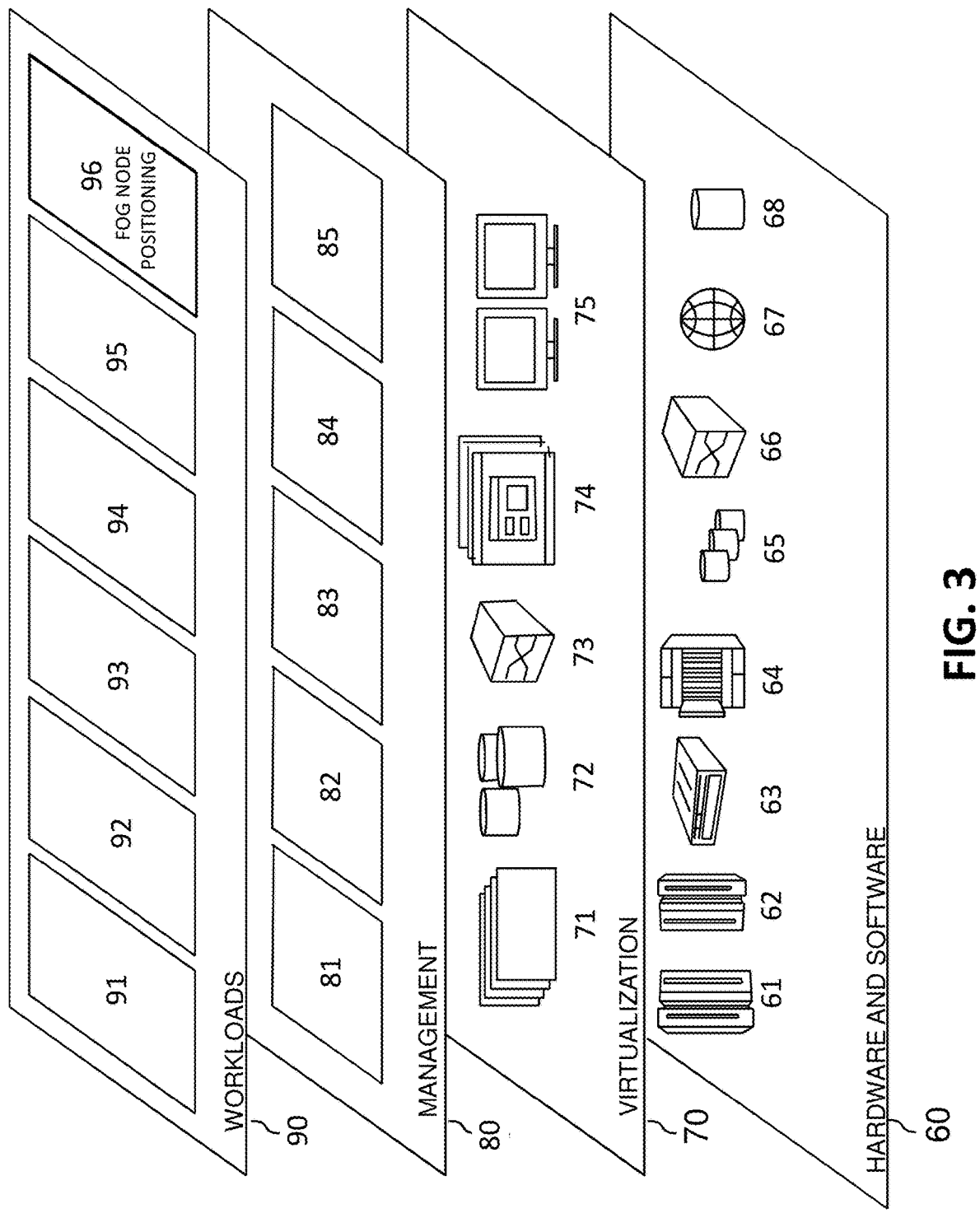
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fog node positioning 96.

Referring back to FIG. 1, the program/utility 40 may include one or more program modules 42 that generally carry out the functions and/or methodologies of embodiments of the invention as described herein (e.g., such as the functionality provided by fog node positioning 96). Specifically, the program modules 42 may predict the volume, velocity, variety, and variability of data generated from different IoT sensors spread across an environment and deploy an appropriate number of fog nodes in the environment with appropriate relative positions, directions, etc. to ensure that the generated data can be captured properly and processed on a near real-time basis. Other functionalities of the program modules 42 are described further herein such that the program modules 42 are not limited to the functions described above. Moreover, it is noted that some of the program modules 42 can be implemented within the infrastructure shown in FIGS. 1-3. For example, the program modules 42 may be representative of a fog node positioning program module 420 as shown in FIG. 4.

Figure 4:
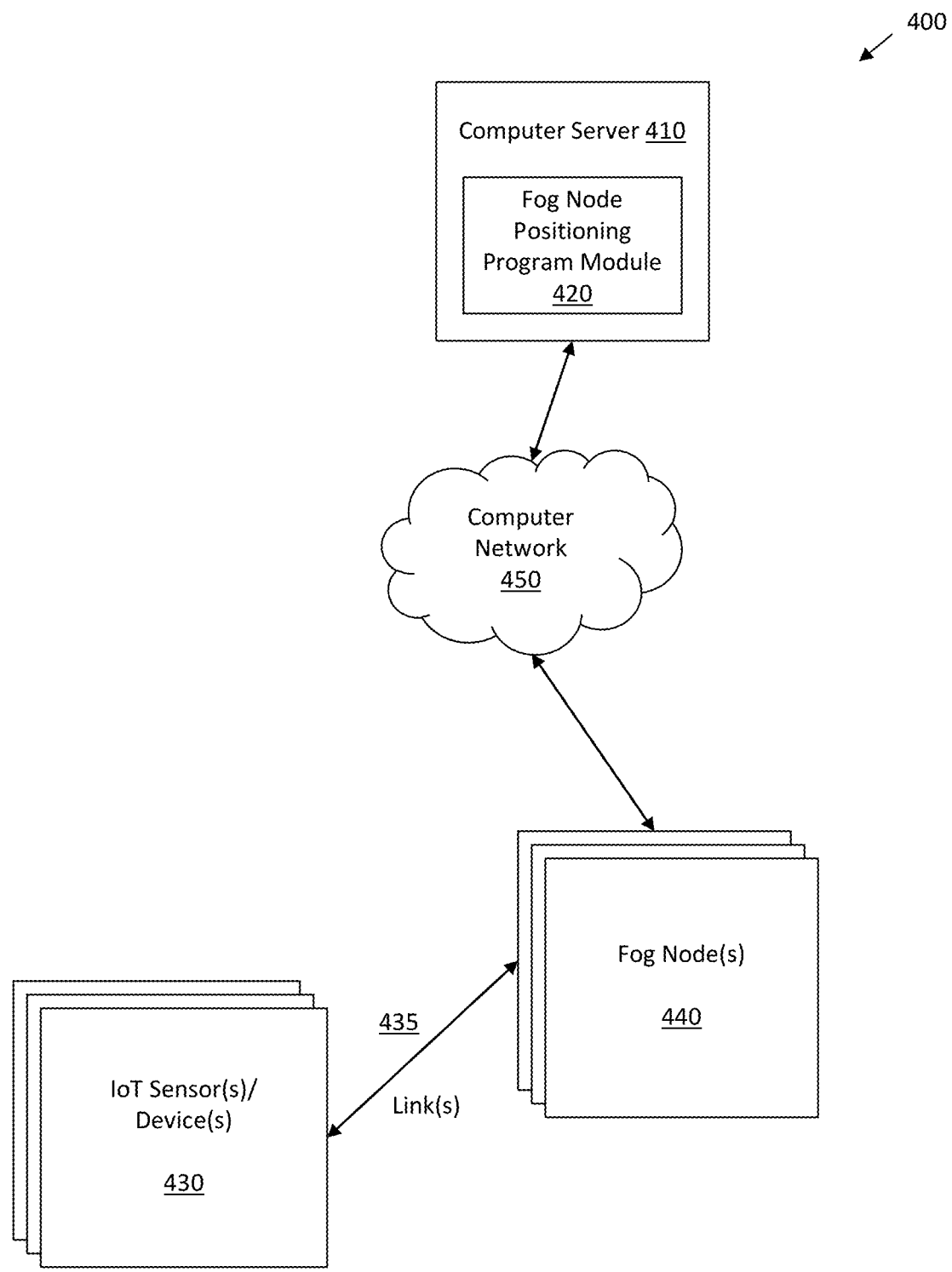
FIG. 4 depicts an illustrative environment in accordance with aspects of the invention.

FIG. 4 depicts an illustrative environment 400 in accordance with aspects of the invention. As shown, the environment 400 comprises a computer server 410, plural IoT sensors/devices 430, and plural fog nodes 440. The computer server 410, the IoT sensors/devices 430, and the fog nodes 440 communicate via a computer network 450, which comprises one or more computer networks such as a LAN, WAN, and the Internet. In a cloud implementation, the network 450 is a cloud computing environment 50 of FIG. 2, and the computer server 410 is a node 10 in the cloud computing environment 50.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the computer server 410 in the environment 400 is situated in the cloud computing environment 50 and is one or more of the nodes 10 shown in FIG. 2. The computer server 410 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the computer server 410 includes a fog node positioning program module 420 which comprises one or more of the program modules 42 shown in FIG. 1. In embodiments, the fog node positioning program module 420 includes program instructions for predicting the volume (e.g., quantity of data), velocity (e.g., frequency with which readings are taken), variety (e.g., types of data), and variability of data (e.g., change over time) generated from the IoT sensors 430 spread across the environment 400 and deploying an appropriate number of fog nodes 440 in the environment 400 with appropriate relative positions, directions, etc. to ensure that the generated data can be captured properly and processed on a near real-time basis, as discussed herein. In embodiments, the program instructions included in the fog node positioning program module 420 of the computer server 410 are executed by one or more hardware processors.

Still referring to FIG. 4, in embodiments, each of the IoT sensors/devices 430 is an Internet and/or network-connected home or building automation device (e.g., smart home device/appliance), sensor or sensor network, or control system. For example, the IoT sensors/devices 430 may be static (fixed-position) or mobile devices and include Internet and/or network-connected temperature sensors, humidity sensors, barometric pressure sensors, wind sensors, precipitation sensors, digital video cameras, digital still cameras, infrared cameras, motion sensors, accelerometers, etc. In embodiments, the IoT sensors/devices 430 may be static or mobile, and different IoT sensors/devices 430 may generate different volumes of data at different velocities, depending on a contextual situation. Additionally, as a result of a change in the contextual situation, the velocity of data generation by the IoT sensors/devices 430 may change.

In embodiments, each of the IoT sensors/devices 430 communicates with one or more of the fog nodes 440 over a link 435, which may be any type of wired or wireless connection, such as a Bluetooth connection, Wi-Fi connection, near-field communication (NFC) connection, 5G connection, etc. Wireless connectivity over the link 435 may have a specified range, beyond which the connectivity may be poor and data transfer from the IoT sensors/devices 430 to the fog nodes 440 may be problematic.

Still referring to FIG. 4, in embodiments, each of the fog nodes 440 is a computer device (computing node) comprising one or more elements of the computer system/server 12 (as shown in FIG. 1). In embodiments, each of the fog nodes 440 may be a static (fixed position) or mobile device that receives data from one or more of the IoT sensors/devices 430 over the link 435 and processes the received data on a real-time or near real-time basis according to rules and/or policies. In particular, the fog nodes 440 may perform data reduction, control response, data virtualization, and data standardization. Additionally, in embodiments, each of the fog nodes 440 sends selected data to the cloud computing environment 50 (e.g., to the computer server 410), e.g., for historical analysis and longer-term storage. In particular, the fog nodes 440 may send virtualized data, historic/predictive analysis, and machine learning data to the computer server 410.

In embodiments, the fog nodes 440 extend the cloud computing environment 50 (e.g., the computer server 410) to be closer to the things that produce and act on IoT data (e.g., the IoT sensors/devices 430). In particular, in embodiments, one or more of the fog nodes 440 are physically closer to one or more of the IoT sensors/devices 430 than the computer server 410. The fog nodes 440 may be deployed anywhere with a network connection: e.g., on a factory floor, on top of a power pole, alongside a railway track, in a vehicle, or on an oil rig. Any device with computing, storage, and network connectivity can be a fog node 440. Examples include industrial controllers, switches, routers, embedded servers, and video cameras. In embodiments, the fog nodes 440 receive and process data from one or more of the IoT sensors/devices 430, thus avoiding the need for all of the data from one or more of the IoT sensors/devices 430 to travel all of the way to the computer server 410 for processing and/or storage.

Figure 5:
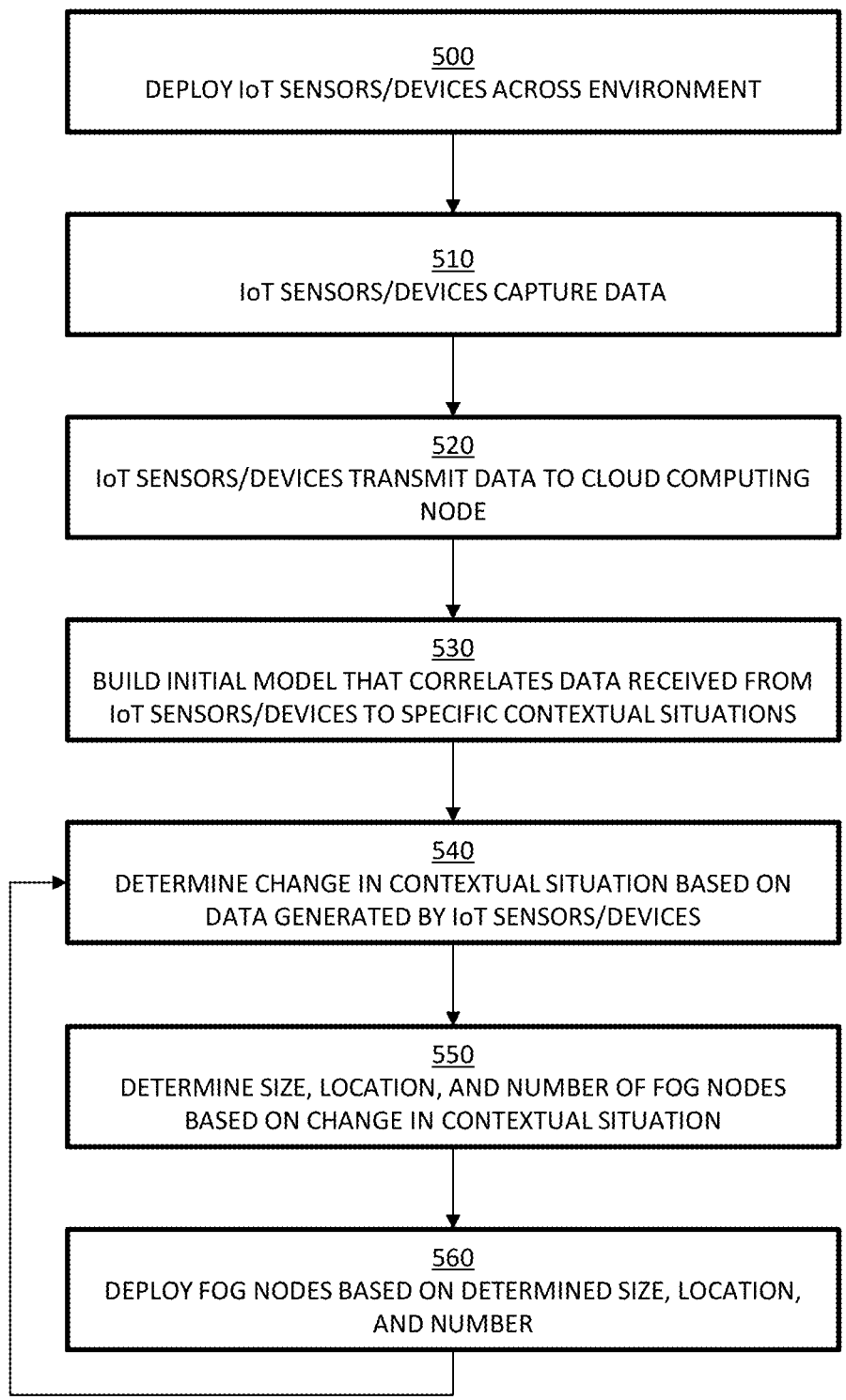
FIG. 5 depicts a flowchart of an exemplary method performed in accordance with aspects of the invention.

FIG. 5 depicts a flowchart of an exemplary method for using an artificial intelligence based system to analyze a contextual situation to predict the volume, velocity, variety, and variability of data generated from different IoT sensors/devices 430 spread across an environment 400 and deploy an appropriate number of fog nodes 440 in the environment 400 with appropriate relative positions, directions, etc. to ensure that the generated data can be captured properly and processed on a near real-time basis. The method of FIG. 5 is performed by the fog node positioning program module 430 of the computer server 410 in accordance with aspects of the invention. The steps of the method are performed in the environment of FIG. 4 and are described with reference to the elements shown in FIG. 4.

In embodiments, using historical machine learning, the fog node positioning program module 420 uses artificial intelligence techniques to predict a contextual situation (e.g., an understanding of the physical space of the environment 400, including the presence and behavior of IoT sensors/devices 430 and fog nodes 440, that is derived from all of the IoT sensors/devices 430 and fog nodes 440, collectively, and the physical space of the environment 400 in which they exist) and, in turn, predict a data transfer, storage and computation load of the fog nodes 440 in the environment 400, based on the volume, velocity, variety, variability of data generated from the IoT sensors/devices 430 present in the environment 400.

In embodiments, the fog node positioning program module 420 identifies real-time locations of the IoT sensors/devices 430 and predicted locations of mobile IoT sensors/devices 430 in the environment 400. Based on the real-time and predicted locations, the fog node positioning program module 420 identifies an optimum relative position of one or more fog nodes 430 in the environment 400, so that data from the IoT sensors/devices 430 may be captured completely and computation needs may be satisfied.

In embodiments, the fog node positioning program module 420 takes into account the strength of the links 435 (e.g., wireless network strength), the types of the links 435 (e.g., types of wireless connectivity), and the volume and velocity of data when determining appropriate locations to place the fog nodes 440 to form a fog node mesh and ensure that all data from the IoT sensors/devices 430 is captured and processed as per the demand.

At step 500, plural IoT sensors/devices 430 are deployed across the environment 400. In embodiments, the fog node positioning program module 420 of the computer server 410 deploys (e.g., determines positions for and activates) the plural IoT sensors/devices 430 across the environment 400 and/or is configured to receive data from the plural IoT sensors/devices 430 situated in the environment 400. In embodiments, the fog node positioning program module 420 receives information uniquely identifying each of the IoT sensors/devices 430 as well as a physical position (e.g., GPS coordinates) of each of the IoT sensors/devices 430 and a relative position (e.g., a position in relation to that of other IoT sensors/devices 430) of each of the IoT sensors/devices 430.

Still referring to FIG. 5, at step 510, the plural IoT sensors/devices 430 capture data. In embodiments, the plural IoT sensors/devices 430 capture different data gathered by the plural IoT sensors/devices 430 present in the environment 400. In particular, the plural IoT sensors/devices 430 may include temperature sensors that capture temperature data, humidity sensors that capture humidity data, barometric pressure sensors that capture barometric pressure data, wind sensors that capture wind speed and direction data, precipitation sensors that capture precipitation quantity data, digital video cameras that capture video, digital still cameras that capture still images, infrared cameras that capture infrared images, motion sensors that capture motion data, and/or accelerometers that capture acceleration data, etc. The plural IoT sensors/devices 430 may include a memory or storage device on which the captured data is stored.

Still referring to FIG. 5, at step 520, the plural IoT sensors/devices 430 transmit data to a cloud computing node, e.g., the computer server 410. In embodiments, the plural IoT sensors/devices 430 transmit the data captured at step 510 to the fog node positioning program module 420 of the computer server 410. In particular, the plural IoT sensors/devices 430 may transmit the temperature data, humidity data, barometric pressure data, wind speed and direction data, precipitation quantity data, video, still images, infrared images, motion data, and/or acceleration data, etc. captured at step 510 to the fog node positioning program module 420, via the fog nodes 440 and the link 435.

Still referring to FIG. 5, at step 530, the computer server 410 builds an initial model that correlates the data received from the IoT sensors/devices 430 to specific contextual situations. In embodiments, the fog node positioning program module 420 of the computer server 410 builds the initial model that correlates the data received from the IoT sensors/devices 430 at step 520 to specific contextual situations. In particular, the fog node positioning program module 420 tracks historical information about the data captured by and received from the IoT sensors/devices 430, including a volume of generated data by each of the IoT sensors/devices 430, a velocity of generated data by each of the IoT sensors/devices 430, a variety of data gathered by each of the IoT sensors/devices 430; a variability of data gathered by each of the IoT sensors/devices 430, and camera feeds received from one or more of the IoT sensors/devices 430.

Still referring to step 530, in embodiments, the fog node positioning program module 420 uses machine learning techniques to analyze the historical information about the data received at step 520 and build a clustering model that identifies different contextual situations when different types of data are generated from the IoT sensors/devices 430. In embodiments, using machine learning, the fog node positioning program module 420 identifies how different IoT sensors/devices of the IoT sensors/devices 430 are generating data in different identified contextual situations. Additionally, in embodiments, the fog node positioning program module 420 identifies relative positions of each of the IoT sensors/devices in the environment 400 for each of the different contextual situations.

Still referring to step 530, in embodiments, the fog node positioning program module 420 classifies each of the IoT sensors/devices 430 based on volume, velocity, variety, and variability of the data generated by the IoT sensor/device in each of the different contextual situations, and the relative position of the IoT sensor/device in the environment 400. In embodiments, each of the IoT sensors/devices 430 has a specification that defines wireless strength (e.g., a strength of the link 435), types of wireless connectivity (e.g., types of the link 435), etc. Based on this specification of the wireless strength and types of wireless connectivity, the fog node positioning program module 420 identifies, for each of the IoT sensors/devices 430, a maximum distance over which the IoT sensor/device is capable of transmitting data to a fog node 440.

Still referring to step 530, in embodiments, the fog node positioning program module 420 uniquely identifies each of the fog nodes 440 (e.g., using a media access control (MAC) address, serial number, or other predetermined or assigned identification information). Additionally, in embodiments, the fog node positioning program module 420 determines a storage capacity and a processing capability for each of the fog nodes 440 and/or each of the IoT sensors/devices 430. In embodiments, one or more of the fog nodes 440 are static fog nodes that capture data from one or more nearby IoT sensors/devices 430 (e.g., one or more IoT sensors/devices 430 that are situated less than the maximum distance from the fog node 440 over which the IoT sensor/device is capable of transmitting data).

Still referring to FIG. 5, at step 540, the computer server 410 determines a change in a contextual situation based on data generated by the IoT sensors/devices 430. In embodiments, the fog node positioning program module 420 of the computer server 410 uses the model built at step 530 and currently received or recently received data from the IoT sensors/devices 430 to determine a change in a contextual situation. In particular, in embodiments, the fog node positioning program module 420 uses the model built at step 530 based on historical information about data received from the IoT sensors/devices 430 to predict a change (e.g., increase or decrease) in traffic load (e.g., data received from the IoT sensors/devices 430) in a changed contextual situation. The fog node positioning program module 420 predicts data generation characteristics, including volume, velocity, variety, and variability, for each of the IoT sensors/devices 430 in the changed contextual situation and determines whether or not the static fog nodes 440 are capable of capturing, storing, and processing on a near real-time basis the data that is predicted to be gathered by the IoT sensors/devices 430.

Still referring to FIG. 5, at step 550, the computer server 410 determines a size, location, and number of fog nodes 440 based on the change in contextual situation. In embodiments, the fog node positioning program module 420 of the computer server 410 determines the size, location, and number of fog nodes 440 based on the change in contextual situation determined at step 540. In particular, in embodiments, if the fog node positioning program module 420 determines at step 540 that the static fog nodes 440 are not capable of capturing, storing, and processing on a near real-time basis the data that is predicted to be gathered by the IoT sensors/devices 430, then the fog node positioning program module 420 determines how many mobile fog nodes 440 are to be placed in (e.g., added to) the environment 400, as well as a type and size of the mobile fog nodes 440, so that all of the data that is predicted to be gathered by the IoT sensors/devices 430 may be captured and processed on real-time basis by the fog nodes 440.

Still referring to FIG. 5, at step 560, the computer server 410 deploys the fog nodes 440 based on the determined size, location, and number. In embodiments, the fog node positioning program module 420 of the computer server 410 causes one or more fog nodes 440 which are mobile fog nodes to be deployed (e.g., added) or redeployed (e.g., repositioned) in the environment 400 in accordance with the size, location, and number determined at step 550. In particular, in embodiments, the fog node positioning program module 420 deploys the one or more fog nodes 440 by configuring one or more of the IoT sensors/devices 430 to communicate with the computer server 410 via the one or more fog nodes 440, rather than directly or via a different fog node 440. Additionally, in embodiments, the mobile fog nodes 440 may be mobile robots, which may be self-moving, and the fog node positioning program module 420 deploys the one or more fog nodes 440 by causing the mobile robots to move to the location determined at step 550.

Still referring to step 560, in embodiments, based on the demand predicted/identified by the fog node positioning program module 420, the fog node positioning program module 420 causes the mobile fog nodes 440 change position within the environment 400 such that they are located in a position (determined at step 550) that enables the plural fog nodes 400 to collectively capture and process all (or at least a greater portion) of the data generated by the IoT sensors/devices 430 on a near real-time basis and satisfy the contextual needs (i.e., the additional data generated by the IoT sensors/devices 430 as a result of the change in the contextual situation). In embodiments, the movement of the mobile fog nodes 440 is dynamic (e.g., based on current user, system, and data requirements) and iterative (e.g., the mobile fog nodes 440 may be continually or periodically repositioned within the environment 400 by the fog node positioning program module 420 to optimize placement in view of additional changes to the contextual situation and other requirements). In embodiments, after the fog node positioning program module 420 deploys the fog nodes at step 560, the flow returns to step 540.

In embodiments, thresholds for data may be established for data type, sensitivity, and bandwidth. If the fog node positioning program module 420 detects that one of the IoT sensors/devices 430 exceeds those thresholds, the fog node positioning program module 420 may notify an end user, administrator, or manager to move one of the fog nodes 440 or alter an accepted data pipeline between the IoT sensor/device 430 and the fog nodes 440 and/or computer server 410. In embodiments, a predetermined magnitude in data (traffic) change from an IoT sensor/device 430 may result in alteration to the path of the data pipeline between the IoT sensor/device 430 and the fog nodes 440 and/or computer server 410.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, data from a plurality of Internet-of-Things (IoT) sensors in an environment;
analyzing, by the computing device using machine learning, historical information about the data from the plurality of IoT sensors;
creating, by the computing device using machine learning, a clustering model using the analyzed historical information and the data from the plurality of IoT sensors,
wherein the clustering model correlates the data from the plurality of IoT sensors to at least one contextual situation of a plurality of contextual situations,
wherein the at least one contextual situation corresponds to a physical space of the environment, including presence and behavior of IoT sensors, devices, and fog nodes in the physical environment, including a change in the environment,
wherein the historical information about the data includes a volume of generated data, a velocity of generated data, a variety of data, and a variability of data, generated by the plurality of IoT sensors, and camera feeds received from one or more of the plurality of IoT sensors, and
wherein the at least one contextual situation is based in part on the volume, the velocity, the variety, and the variability of the data from the plurality of IoT sensors;
determining, by the computing device, a number of computing nodes based on the clustering model and additional data received from the plurality of IoT sensors;
deploying, by the computing device, at least one mobile computing node in the environment based on the determined number of computing nodes and a number of existing computing nodes in the environment;
identifying differences in data generated by different ones of the plurality of IoT sensors; and
correlating the differences in the data generated to different contextual situations of the plurality of contextual situations.

2. The method according to claim 1, further comprising determining, by the computing device, a change in at least one of the contextual situations using the clustering model and the additional data received from the plurality of IoT sensors.

3. The method according to claim 2, wherein the determining the number of computing nodes is further based on the change in the at least one contextual situation.

4. The method according to claim 1, wherein the data from the plurality of IoT sensors comprises at least one selected from the group consisting of:
temperature data;
humidity data;
barometric pressure data;
wind speed and direction data;
precipitation quantity data;
video;
still images;
infrared images;
motion data; and
acceleration data.

5. The method according to claim 1, wherein the data from the plurality of IoT sensors is received by the computing device via at least one of the existing computing nodes in the environment.

6. The method according to claim 5, wherein the at least one of the existing computing nodes in the environment receives the data via a Bluetooth connection, a Wi-Fi connection, a near-field communication (NFC) connection, or a 5G connection.

7. The method according to claim 1, wherein the creating the clustering model comprises correlating the data from the plurality of IoT sensors to the contextual situation based on the volume, the velocity, the variety, and the variability of the data received from the plurality of IoT sensors.

8. A computer program product comprising one or more computer readable storage media having program instructions collectively stored on the one or more computer readable storage media, the program instructions executable to:

receive data from a plurality of Internet-of-Things (IoT) sensors in an environment;

analyze, using machine learning, historical information about the data from the plurality of IoT sensors;

create, using machine learning, a clustering model using the analyzed historical information and the data from the plurality of IoT sensors wherein the creating the clustering model comprises correlating the data from the plurality of IoT sensors to at least one contextual situation of a plurality of contextual situations, including a change in the environment;

determine the change in the environment based on the clustering model and additional data received from the plurality of IoT sensors;

determine a number of computing nodes based on the clustering model and the change in the environment;

deploy at least one mobile computing node in the environment based on the determined number of computing nodes and a number of existing computing nodes in the environment;

identify differences in data generated by different ones of the plurality of IoT sensors;

correlate the differences in the data generated to different contextual situations of the plurality of contextual situations; and identify a relative position in the environment for each of the plurality of IoT sensors for each of the different contextual situations.

9. The computer program product according to claim 8, wherein the data from the plurality of IoT sensors comprises at least one selected from the group consisting of:
temperature data;
humidity data;
barometric pressure data;
wind speed and direction data;
precipitation quantity data;
video;
still images;
infrared images;
motion data; and
acceleration data.

10. The computer program product according to claim 8, wherein the data from the plurality of IoT sensors is received via at least one of the existing computing nodes in the environment.

11. The computer program product according to claim 10, wherein the at least one of the existing computing nodes in the environment receives the data via a Bluetooth connection, a Wi-Fi connection, a near-field communication (NFC) connection, or a 5G connection.

12. The computer program product according to claim 8, wherein the historical information about the data includes a volume of generated data, a velocity of generated data, a variety of data, and a variability of data, generated by the plurality of IoT sensors, and camera feeds received from one or more of the plurality of IoT sensors, and
wherein the at least one contextual situation is based on the volume, the velocity, the variety, and the variability of the data from the plurality of IoT sensors.

13. The computer program product according to claim 8, wherein the existing computing nodes in the environment are static nodes.

14. A system comprising:
a processor, a computer readable memory, one or more computer readable storage media, and program instructions collectively stored on the one or more computer readable storage media, the program instructions executable to:
receive data from a plurality of Internet-of-Things (IoT) sensors in an environment;
analyze, using machine learning, historical information about the data from the plurality of IoT sensors;
create, using machine learning, a clustering model using the analyzed historical information and data from the plurality of IoT sensors,
wherein the clustering model correlates the data from the plurality of IoT sensors to at least one contextual situation of a plurality of contextual situations,
wherein the at least one contextual situation corresponds to a physical space of the environment, including a change in the environment;
determine a number of computing nodes based on the clustering model and additional data received from the plurality of IoT sensors;
deploy at least one mobile computing node in the environment based on the determined number of computing nodes and a number of existing computing nodes in the environment;
identify differences in data generated by different ones of the plurality of IoT sensors;
correlate the differences in the data generated to different contextual situations of the plurality of contextual situations; and
identify a relative position in the environment for each of the plurality of IoT sensors for each of the different contextual situations.

15. The system according to claim 14, the program instructions further being executable to determine a change in at least one of the contextual situations using the model and the additional data received from the plurality of IoT sensors.

16. The system according to claim 15, wherein the determining the number of computing nodes is further based on the change in the at least one contextual situation.

17. The system according to claim 14, wherein the data from the plurality of IoT sensors comprises at least one selected from the group consisting of:
temperature data;
humidity data;
barometric pressure data;
wind speed and direction data;
precipitation quantity data;
video;
still images;
infrared images;
motion data; and
acceleration data.

18. The system according to claim 14, wherein the data from the plurality of IoT sensors is received by the computing device via at least one of the existing computing nodes in the environment.

19. The system according to claim 18, wherein the at least one of the existing computing nodes in the environment receives the data via a Bluetooth connection, a Wi-Fi connection, a near-field communication (NFC) connection, or a 5G connection.

20. The system according to claim 14, wherein the historical information about the data includes a volume of generated data, a velocity of generated data, a variety of data, and a variability of data, generated by the plurality of IoT sensors, and camera feeds received from one or more of the plurality of IoT sensors, wherein the at least one contextual situation is based on the volume, the velocity, the variety, and the variability of the data from the plurality of IoT sensors, and wherein the creating the clustering model comprises correlating the data received from the plurality of IoT sensors to the contextual situation based on the volume, the velocity, the variety, and the variability of the data received from the plurality of IoT sensors.

* * * * *